United States Patent
Lee et al.

(10) Patent No.: US 12,476,004 B2
(45) Date of Patent: Nov. 18, 2025

(54) DEEP NEURAL NETWORK PRE-TRAINING METHOD FOR CLASSIFYING ELECTROCARDIOGRAM (ECG) DATA

(71) Applicant: VUNO INC., Seoul (KR)

(72) Inventors: Byeongtak Lee, Seoul (KR); Youngjae Song, Anyang-si (KR); Woong Bae, Seoul (KR); Oyeon Kwon, Seoul (KR)

(73) Assignee: VUNO INC., Seoul (KR)

( * ) Notice: Subject to any disclaimer, the term of this patent is extended or adjusted under 35 U.S.C. 154(b) by 974 days.

(21) Appl. No.: 17/464,685

(22) Filed: Sep. 2, 2021

(65) Prior Publication Data

US 2022/0084679 A1  Mar. 17, 2022

(30) Foreign Application Priority Data

Sep. 15, 2020  (KR) ................. 10-2020-0118669

(51) Int. Cl.
*G16H 50/20* (2018.01)
*A61B 5/353* (2021.01)
(Continued)

(52) U.S. Cl.
CPC ............. *G16H 50/20* (2018.01); *A61B 5/353* (2021.01); *A61B 5/355* (2021.01); *A61B 5/36* (2021.01);
(Continued)

(58) Field of Classification Search
CPC ......... G16H 50/20; G16H 50/70; G06N 20/00
See application file for complete search history.

(56) References Cited

U.S. PATENT DOCUMENTS 11,899,765 B2 * 2/2024 Seroussi ................ G06N 20/00
2014/0180986 A1 6/2014 Hinton et al.
(Continued)

FOREIGN PATENT DOCUMENTS

KR  10-2006-0117546 A  11/2006
KR  10-0748184 B1  8/2007
(Continued)

OTHER PUBLICATIONS

Milad Salem, et al., ECG Arrhythmia Classification Using Transfer Learning from 2-Dimensional Deep CNN Features, 2018 IEEE Biomedical Circuits and Systems Conference (BioCAS), 4 pages.
(Continued)

*Primary Examiner* — Jay M. Patel
(74) *Attorney, Agent, or Firm* — IP & T GROUP LLP

(57) ABSTRACT

A deep neural network pre-training method for classifying electrocardiogram (ECG) data and a device for the same are disclosed. A method for training an ECG feature extraction model may include receiving a ECG signal, extracting one or more first features related to the ECG signal by inputting the ECG signal to a rule-based feature extractor or a neural network model, extracting at least one second feature corresponding to the at least one first feature by inputting the ECG signal to an encoder, and pre-training the ECG feature extraction model by inputting the at least one second feature into at least one of a regression function and a classification function to calculate at least one output value. The pre-training of the ECG feature extraction model may include training the encoder to minimize a loss function that is determined based on the at least one output value and the at least one first feature.

13 Claims, 9 Drawing Sheets

(51) Int. Cl.
*A61B 5/355* (2021.01)
*A61B 5/36* (2021.01)
*A61B 5/366* (2021.01)
*G06N 20/00* (2019.01)
*G16H 50/70* (2018.01)

(52) U.S. Cl.
CPC .............. *A61B 5/366* (2021.01); *G06N 20/00* (2019.01); *G16H 50/70* (2018.01); *G06F 2218/08* (2023.01); *G06F 2218/12* (2023.01)

(56) References Cited

U.S. PATENT DOCUMENTS

| | | | |
|---|---|---|---|
| 2015/0257712 | A1 | 9/2015 | Sarrafzadeh et al. |
| 2019/0150794 | A1* | 5/2019 | Vrudhula ............ H04W 12/065 |
| 2020/0226218 | A1* | 7/2020 | Ramakrishnan ....... G06N 3/045 |
| 2021/0204858 | A1* | 7/2021 | Attia ..................... A61B 5/7264 |
| 2021/0374513 | A1* | 12/2021 | Sur ........................ G16H 50/20 |
| 2022/0218262 | A1* | 7/2022 | Dziubinski ............ A61B 5/355 |

FOREIGN PATENT DOCUMENTS

| | | |
|---|---|---|
| KR | 10-1524226 B1 | 5/2015 |
| KR | 10-2016-0102690 A | 8/2016 |
| KR | 10-2017-0082440 A | 7/2017 |
| KR | 10-2019-0079110 A | 7/2019 |
| KR | 10-2022510 B1 | 9/2019 |
| KR | 10-2020-0041697 A | 4/2020 |

OTHER PUBLICATIONS

"Waveform Segmentation Using Deep Learning", Web page <https://kr.mathworks.com/help/signal/examples/waveform-segmentation-using-deep-learning.html>, 2020, 14pages with English translation.

* cited by examiner

DEEP NEURAL NETWORK PRE-TRAINING METHOD FOR CLASSIFYING ELECTROCARDIOGRAM (ECG) DATA

This application claims the benefit of Korean Patent Application No. 10-2020-0118669, filed on Sep. 15, 2020, which is hereby incorporated by reference as if fully set forth herein.

BACKGROUND OF THE INVENTION

Field of the Invention

The present disclosure relates to a deep neural network pre-training method for classifying electrocardiogram (ECG) data, and more particularly to a method for pre-training an electrocardiogram (ECG) feature extraction model using a self-supervised learning method, and outputting an electrocardiogram (ECG) label using the pre-trained model.

Discussion of the Related Art

In order to construct a high-performance classification model (also called a high-performance classification network or a high-performance classifier), a large amount of labeled data is required. For example, in order to construct an artificial neural network capable of performing image classification with the accuracy of 60-70%, a minimum of several thousand of photographs (or pictures) is generally required according to the number of data types to be classified.

If the amount of actual data is insufficient, it is difficult to construct a high-performance classification model. In a variety of generation models such as a Generative Adversarial Network (GAN), a Variational Auto Encoder (VAE), etc., one or more photographs similar to real images of a target object can be obtained using a small number of real photographs of the target object. However, it is impossible to increase performance of the classification models using data generated by the above-mentioned generation models.

In more detail, since the above-mentioned generation models cannot recognize which type of photographs correspond to the data generated by each generation model, the above-mentioned generation models may have difficulty in performing accurate labeling. When constructing an excessively large number of photographs using the generation models, it is almost impossible for a user to label different photographs separately from each other. As a result, assuming that the amount of actual data to be applied to the generation models is insufficient, such generation models may have difficulty in manufacturing a high-performance classification model.

In particular, electrocardiogram (ECG) data known to those skilled in the art includes a very small number of data labeled with diagnostic information such as a disease name. ECG data measured by hospitals may also have problems such as unlabeled data, computational errors, etc. Generally, most data included in the ECG data measured by hospitals may be unlabeled data such as health medical examination, regular checkup of inpatients, etc. As a result, in order to create labeled data for ECG data, medical staff who works in hospitals should manually diagnose diseases by directly analyzing the measured ECG data, and should manually classify the diagnostic results of ECG data into disease names, thereby creating labeled data corresponding to different diseases. As a result, creating such labeled data is very expensive. In order to address these issues as well as to reduce the costs required for labeled data, there is needed a learning method that can enable the entire unlabeled ECG data to be utilized for learning and can implement a high-performance model using a small number of task labels.

SUMMARY OF THE INVENTION

Accordingly, the present disclosure is directed to a deep neural network pre-training method for classifying electrocardiogram (ECG) data that substantially obviates one or more problems due to limitations and disadvantages of the related art.

An object of the present disclosure is to provide a new self-supervised learning method for applying features of an electrocardiogram (ECG) signal to supervised learning.

Another object of the present disclosure is to provide a method for applying the new self-supervised learning method to the actual clinical environment that has difficulty in acquiring a large amount of ECG labels.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for training an ECG feature extraction model may include receiving a ECG signal, extracting one or more first features related to the ECG signal by inputting the ECG signal to a rule-based feature extractor or a neural network model, extracting at least one second feature corresponding to the at least one first feature by inputting the ECG signal to an encoder, and pre-training the ECG feature extraction model by inputting the at least one second feature into at least one of a regression function and a classification function to calculate at least one output value. The pre-training of the ECG feature extraction model may include training the encoder to minimize a loss function that is determined based on the at least one output value and the at least one first feature.

The extracting the at least one first feature may include classifying waveforms of the ECG signal; and extracting the at least one first feature from the ECG signal waveforms according to a predetermined rule.

The classifying the ECG signal waveforms may include classifying the ECG signal into P waves, QRS complex, and T waves, and the extracting the at least one first feature may include extracting the at least one first feature corresponding to at least one of a heart rate, a PR interval, a QRS duration, a QT interval, a QT corrected, an R axis, a P axis, and a T axis, based on the P waves, the QRS complex, and the T waves.

The method may further include performing transfer learning of the pre-trained encoder using labeled ECG signals and at least one feature value of the labeled ECG signals.

The performing of the transfer learning may include, when the labeled ECG signals are input to the pre-trained encoder, adjusting parameters related to the encoder to minimize a difference between the feature value of the labeled ECG signal and an output value of the pre-trained encoder.

The pre-training step may include determining a parameter of at least one of the regression function and the classification function and a parameter of the encoder.

The at least one output value includes at least one first output value calculated by inputting the at least one second feature to the regression function, and at least one second output value calculated by inputting the at least one second feature to the classification function.

The pre-training step may include determining a first loss function based on the at least one first output value and the at least one first feature, determining a second loss function based on the at least one second output value and the at least one first feature, and training the ECG feature extraction model to minimize a loss function that is determined by a combination of the first loss function and the second loss function.

In accordance with another aspect of the present disclosure, a method for outputting electrocardiogram (ECG) labels may include receiving electrocardiogram (ECG) signal, extracting at least one second feature corresponding to the ECG signal by inputting the ECG signal to an encoder, and outputting ECG labels corresponding to the extracted at least one second feature by inputting the extracted at least one second feature to a classifier, wherein the encoder is pre-trained by a self-supervised learning method based on both the at least one first feature extracted from either a rule-based feature extractor or a neural network model and the at least one second feature extracted from the encoder.

The encoder and the classifier may be configured to perform fine-tuning based on labeled ECG signals.

The classifier may be trained based on an electrocardiogram (ECG) signal that has already recognized a corresponding label.

In accordance with another aspect of the present disclosure, a computer program stored in a computer-readable storage medium may include performing operations required to train an electrocardiogram (ECG) feature extraction model when executed by at least one processor. The operations may include extracting at least one first feature related to electrocardiogram (ECG) signal by inputting the ECG signal to either a rule-based feature extractor or a neural network model, extracting at least one second feature corresponding to the at least one first feature by inputting the ECG signal to an encoder, and pre-training the ECG feature extraction model by inputting the at least one second feature into at least one of a regression function and a classification function to calculate at least one output value. In the pre-training of the ECG feature extraction model, the processor may be configured to pre-train the encoder to minimize a loss function that is determined based on the at least one output value and the at least one first feature.

In accordance with another aspect of the present disclosure, a server may include a processor provided with one or more cores, a communication interface, and a memory. The processor may be configured to receive electrocardiogram (ECG) signal, extract one or more first features related to the ECG signal by inputting the ECG signal to a rule-based feature extractor or a neural network model, extract at least one second features corresponding to the at least one first feature by inputting the ECG signal to an encoder, and pre-train the ECG feature extraction model by inputting the at least one second feature into at least one of a regression function and a classification function to calculate at least one output value. In the pre-training of the ECG feature extraction model, the processor may be configured to pre-train the encoder to minimize a loss function that is determined based on the at least one output value and the at least one first feature.

In accordance with another aspect of the present disclosure, a device for training an electrocardiogram (ECG) feature extraction model may include a processor. The processor may receive electrocardiogram (ECG) signal, may extract one or more first features related to the ECG signal by inputting the ECG signal to a rule-based feature extractor or a neural network model, may extract at least one second feature corresponding to the at least one first feature by inputting the ECG signal to an encoder, and may pre-train the ECG feature extraction model by inputting the at least one second feature into at least one of a regression function and a classification function to calculate at least one output value. In the pre-training of the ECG feature extraction model, the processor may be configured to pre-train the encoder to minimize a loss function that is determined based on the at least one output value and the at least one first feature.

In accordance with another aspect of the present disclosure, a server may include a processor provided with one or more cores, a communication interface, and a memory. The processor may be configured to receive electrocardiogram (ECG) signal, extract one or more features corresponding to the ECG signal by inputting the ECG signal to an encoder, and output ECG labels corresponding to the extracted features by inputting the extracted features to a classifier. The encoder may be pre-trained by a self-supervised learning method based on both a first feature extracted from either a rule-based feature extractor or a neural network model and the at least one second feature extracted from the encoder.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
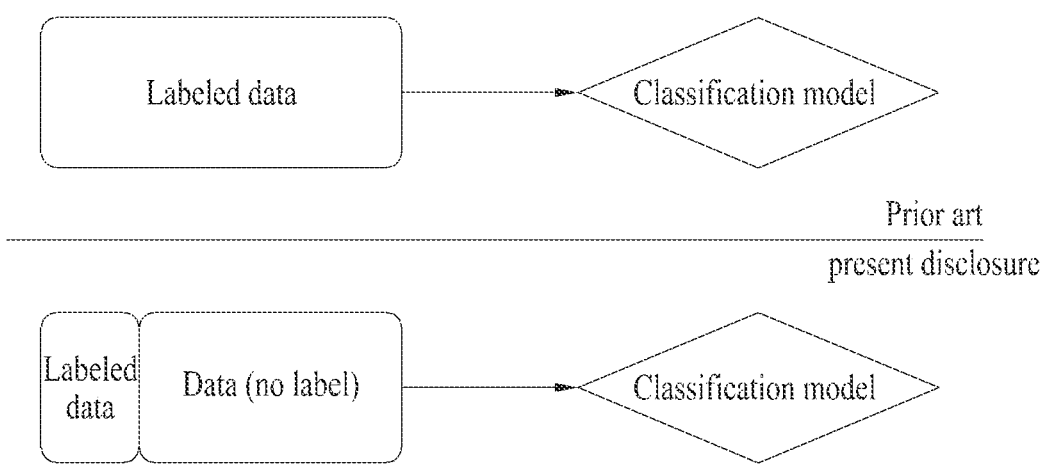
FIG. 1 is a conceptual diagram illustrating a self-supervised learning method according to an embodiment of the present disclosure.

In association with the embodiments of the present disclosure, specific structural and functional descriptions are disclosed only for illustrative purposes, the embodiments of the present disclosure can be implemented in various ways without departing from the scope or spirit of the present disclosure.

It will be understood that the terms "first" and "second" are used herein to describe various elements and are only used to distinguish one element from another element. Thus, a first element may be termed a second element, and similarly, a second element may be termed a first element without departing from the teachings of the present disclosure.

It will be understood that when an element is referred to as being "connected to" another element, it can be directly connected to the other element, or intervening elements may also be present. In contrast, when an element is referred to as being "directly connected to" another element, no intervening elements are present. Other expressions describing relationships between components, such as "between", "directly between", "adjacent to" and "directly adjacent to", may be construed similarly.

Terms used in the following description are used only to describe the specific embodiments and are not intended to restrict the present disclosure. The expression of singularity includes a plural meaning unless the singular expression is explicitly distinguishing based on the context. In the specification, the terms "comprising," "including," and "having" shall be understood to designate the presence of particular features, numbers, steps, operations, elements, parts, or combinations thereof, but not to preclude the presence or addition of one or more other features, numbers, steps, operations, elements, parts, or combinations thereof.

Unless otherwise defined, all terms used herein, which include technical or scientific terms, have the same meanings as those generally appreciated by those skilled in the art. The terms, such as ones defined in common dictionaries, should be interpreted as having the same meanings as terms in the context of the pertinent technology, and should not be interpreted as having ideal or excessively formal meanings unless clearly defined in the specification.

The embodiments may be implemented in various kinds of devices, for example, a personal computer (PC), a laptop, a tablet, a smartphone, a television, a smart home appliance, an intelligent vehicle, a kiosk, a wearable device, etc. Reference will now be made in detail to embodiments of the present disclosure, examples of which are illustrated in the accompanying drawings. Throughout the disclosure, like reference numerals refer to like parts throughout the various figures and embodiments of the present disclosure.

FIG. 1 is a conceptual diagram illustrating a self-supervised learning method according to an embodiment of the present disclosure.

Referring to FIG. 1, an example of the supervised learning method is illustrated. In the conventional supervised learning method, a classification model has been trained and manufactured using a large amount of labeled data. The operation for learning a process of performing a task using such labeled data may be referred to as supervised learning.

Supervised learning has disadvantages in that, when the amount of actual data is insufficient, it is difficult to construct a high-performance classification model using the insufficient amount of actual data. However, it is difficult for supervised learning to correctly perform labeling indicating which photograph corresponds to the created data. When creating a very large number of photographs, it is almost impossible for a user (e.g., medical staff) to manually perform labeling of many photographs one by one. There are various methods for solving the above problems, and a representative example of such methods is a self-supervised learning method. The self-supervised learning method may refer to a supervised learning algorithm implemented using unlabeled data.

When the existing machine learning algorithm learns two training datasets, even if the two datasets have similar features, two different models may be independently created and used. For example, assuming that the first model from among the two models is a model for classifying furniture into various furniture categories such as a sofa, a dining table, a closet, etc. and the second model is a binary classification model for identifying whether or not the corresponding furniture from among various furniture categories is the sofa, the first model and the second model can be learned independently from each other.

On the other hand, transfer learning may refer to a method for learning a new model by receiving information of the previously used model. For example, if a convolutional network for classifying furniture is previously formed, the feature of actually classifying the furniture is similar to the feature of classifying whether or not the corresponding furniture is the sofa. Thus, if the features created in the pre-trained convolution network are applied to a process of forming a new model without change, the learning time can be greatly reduced. At this time, the model capable of being previously learned may be defined as a pre-training model, and a process of training (or learning) a new model using the pre-training model may be defined as fine-tuning.

In accordance with one embodiment, the ECG feature extraction model may be pre-trained using self-supervised learning, such that labels (e.g., diagnosis names) corresponding to ECG signals can be output through a new model formed using the pre-trained model. Accordingly, an encoder designed to extract features of ECG data can be trained using unlabeled data, and various ECG signal analysis tasks can be performed by applying the corresponding encoder to transfer learning.

Figure 2:
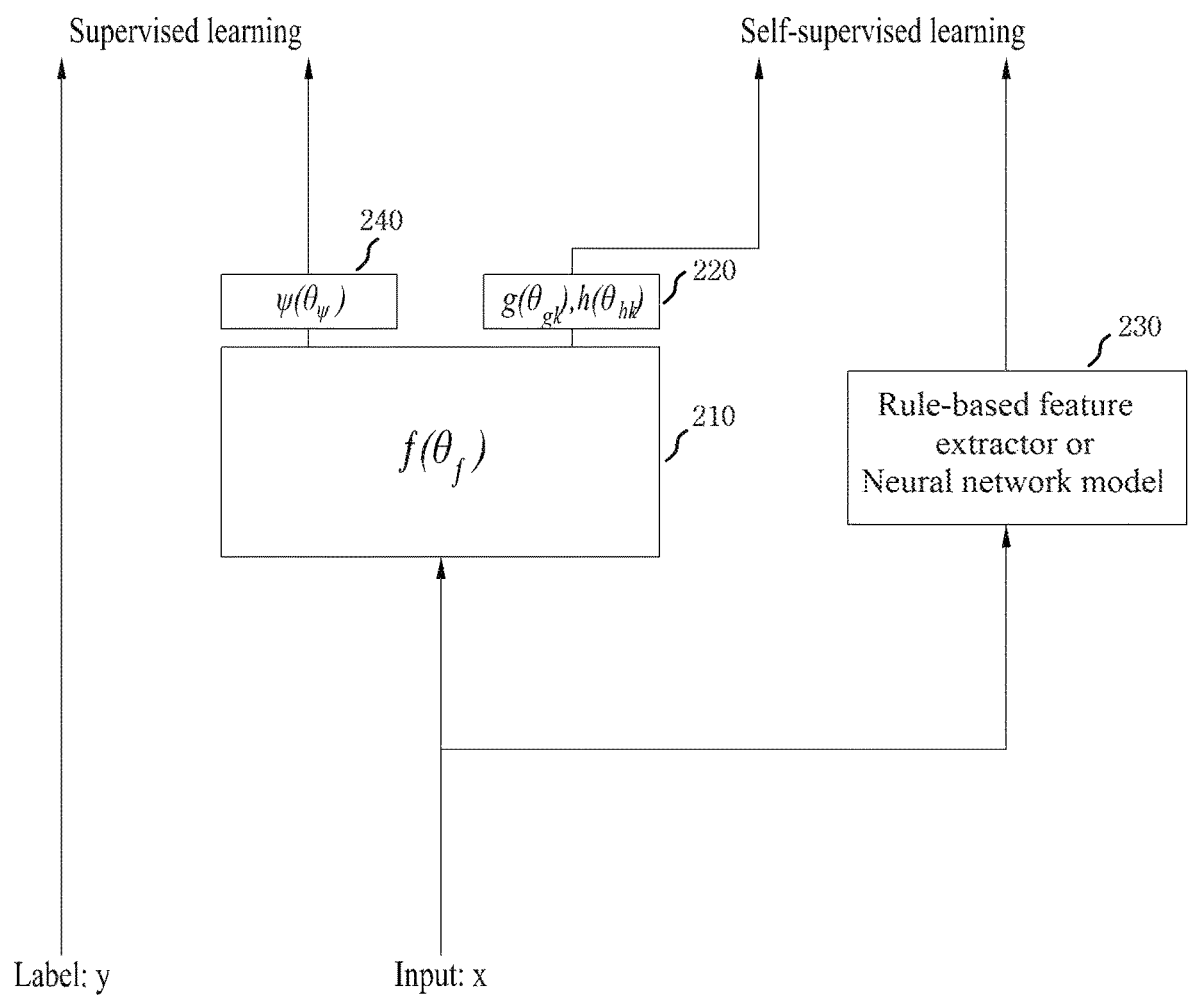
FIG. 2 is a conceptual diagram illustrating an unsupervised learning method for deep learning-based ECG data according to an embodiment of the present disclosure.

FIG. 2 is a conceptual diagram illustrating an unsupervised learning method for deep learning-based ECG data according to an embodiment of the present disclosure.

Referring to FIG. 2, the ECG feature extraction model according to the embodiment of the present disclosure may include an encoder 210, a regression-function and classification-function module 220, a rule-based feature extractor 230, and/or a neural network model (not shown). The ECG feature extraction model may extract features corresponding to ECG signals through self-supervised learning. In the following description, the term "feature" may conceptually include a feature vector.

An ECG label output model may include the encoder 210 and a classifier 240. The encoder 210 of the ECG feature extraction model can be pre-trained through the self-supervised learning, and the ECG label output model can output labels corresponding to ECG signals using the pre-trained encoder 210 and the classifier 240.

The operations of the ECG feature extraction model are as follows. The rule-based feature extractor 230 can extract at least one first feature corresponding to the received ECG data. A detailed method for operating the rule-based feature extractor 230 will hereinafter be described with reference to FIG. 5.

With respect to self-supervised learning, models or functions of $f$, $(g_k)_{k \in [K]}$, $(h_k)_{k \in [K]}$ may be considered. 'f' is a feature extraction model or feature extraction function ($(f(x: \theta_f))$), '$g_k$' may be a regression function or a regression model, and '$h_k$' may be a classification function or a classification model. Here, K is $[K]:=\{1, \ldots, K\}$, and $\theta=(\theta_f, \theta_g, \theta_h)$ may be considered as the models and related parameters.

The encoder (or the feature extraction module) 210 may extract at least one second feature $(\hat{Z}_1, \ldots, \hat{Z}_K \in Z)$ from the electrocardiogram data (x) based on the feature extraction model or feature extraction function $(f(\bullet;\theta_f): X \to Z^K \subset \mathbb{R}^K)$. Here, Z may include at least one second feature obtained by obtaining or extracting the ECG signal (or ECG data) collected at predetermined time intervals (eg, 5 seconds) based on K times pre-training (eg, through 12 leads) or transfer learning.

In the regression-function and classification-function module 220, may input or map the at least one second feature to the regression function and/or the classification function to calculate at least one mapping result value or at least one output value.

Specifically, the regression function may be defined as $g_k(\bullet;\theta_{g_k}): Z \to \mathbb{R}$. The regression function and classification function module 220 may obtain or calculate at least one output value (or at least one first output value) by inputting or mapping the at least one second feature to the regression function. The output value (or at least one first output value) for the regression function may be learned such that the squared difference $((z_k-\mu_k)/\sigma_k)_{k \in [K]}$ from the normalized features is minimized. $\mu_k$, $\sigma_k$ may be the mean and standard deviation of samples associated with each task specified The classification function may be defined as $h_k(\bullet;\theta_{h_k}): Z \to \mathbb{R}$. The regression function and classification function module 220 may obtain or calculate at least one output value (or at least one second output value) by inputting or mapping the at least one second feature to the classification function. Here, the classification function may be used to predict whether the at least one second feature corresponds to a normal feature space or an annotated typical feature space based on a binary label $((B (z_k))k \in [K])$ according to Table 1 below.

That is, the regression function and classification function module 220 may input or map the at least one second feature to the regression function and/or the classification function to calculate at least one corresponding output value (or the at least one first output value and/or the at least one second output value). The at least one output value (or the at least one first output value and/or the at least one second output value) may be reflected in Equation 1 to be described later and used to determine the first loss function and the second loss function.

Specifically, the ECG feature extraction model may determine a first loss function based on the at least one first output value and the at least one first feature. Similarly, the ECG feature extraction model may determine a second loss function based on the at least one second output value and the at least one first feature. The ECG feature extraction model may be trained to minimize the loss function shown in the following equation 1 determined by a combination of the first loss function and the second loss function. The operation of learning the ECG feature extraction model to minimize the loss function may refer to a process of determining an encoder parameter, a regression function parameter, and a classification function parameter that are used to minimize the loss function.

$$L(\theta; x) = \sum_{k=1}^{K} \left( \alpha * \left(g_k(f(x; \theta_f); \theta_{gk}) - \frac{z_k - \mu_k}{\sigma_k}\right)^2 + (1-\alpha) * BCE(h_k(f(x; \theta_f); \theta_{h_k}), B(z_k)) \right)$$ [Equation 1]

In Equation 1, $\alpha$ is a hyperparameter for determining contribution of the first loss function and contribution of the second loss function, $\mu_k$ is an average of samples related to each designated task, $\sigma_k$ is a standard deviation of samples related to each designated task, BCE is an abbreviation of a binary cross entropy, $(z_1, \ldots, z_k)$ may be the at least one first feature extracted by the rule-based feature extractor 230, and $B(z_k)$ may be a label of the at least one first feature. Examples of $\mu_k$, $\sigma_k$ and $B(z_k)$ may be identical to those of Table 1.

TABLE 1

|  | HR | PR | QRS | QT | QTC | Ra | Pa | Ta |
|---|---|---|---|---|---|---|---|---|
| std. cutoff | 21.6 | 12.5 | 15 | 40 | 40 | 15 | 40 | 30 |
| mean/std | 73/18 | 184/18 | 94/11 | 395/53 | 380/43 | 38/38 | 30/58 | 38/39 |
| normal range | [60, 100] | [120, 200] | [60, 100] | [300, 440] | [300, 440] | [-30, 90] | [0, 75] | [0, 90] |

The ECG label output model may output labels corresponding to ECG signals using the pre-trained encoder 210 and the classifier 240, as represented by Equation 1. In more detail, the encoder 210 may extract features corresponding to ECG signals, and the classifier 240 may output ECG labels corresponding to the extracted features using the classification function ((p).

The ECG label output model according to the embodiment may perform fine tuning based on ECG signals, labeling of which was completed, as represented by the following equation 2. The fine tuning may refer to a process for updating parameters by enabling the pre-trained model to additionally learn new data.

$$\theta_f^*, \theta_\varphi^* = \arg\min_{\theta_f, \theta_\varphi} \sum_{(x,y) \in \mathcal{D}} \mathcal{L}(\varphi(f(x; \theta_f); \theta_\varphi), y)$$ [Equation 2]

In Equation 2, y is a label corresponding to the ECG signal (x), and $\mathcal{L}(\varphi(f(x;\theta_f):\theta_\varphi).y)$ may be a loss function for training the ECG label output model. The ECG label output model may determine the encoder parameter ($\theta^*_f$) and the classifier parameter ($\theta^*_\varphi$) that are used to minimize $\mathcal{L}(\varphi(f(x;\theta_f):\theta_\varphi).y)$.

Alternatively, transfer learning of the pre-trained encoder can be performed using the labeled ECG signal and/or feature values of the labeled ECG signal. In this case, when the labeled ECG signal is input to the pre-trained encoder, parameters related to the encoder (e.g., the encoder parameter ($\theta^*_f$), and/or the classifier parameter ($\theta^*_\varphi$, etc.) can be adjusted to minimize a difference between the labeled feature value (or $B(z_k)$) and the output value of the pre-trained encoder (or the output value calculated by Equation 1).

In accordance with another embodiment, parameters of the pre-trained encoder may be fixed, and only parameters of the classifier 240 may be learned using labeled ECG signals.

Figure 3:
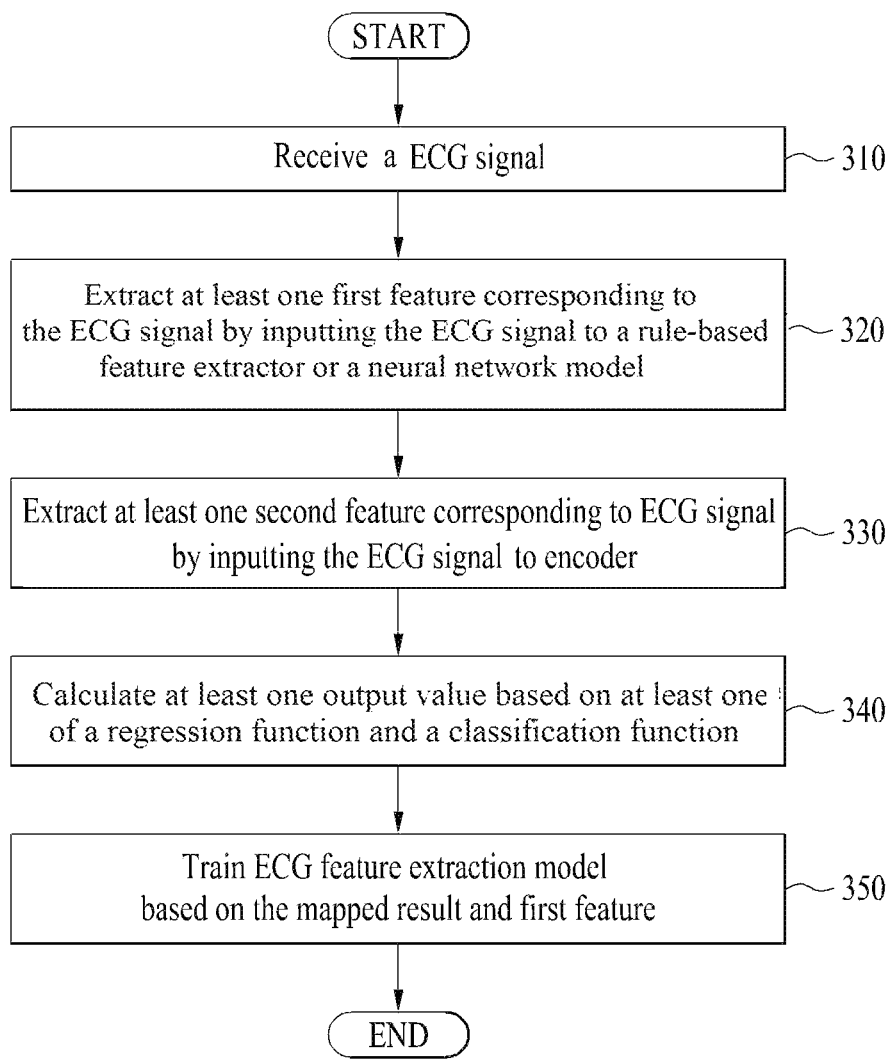
FIG. 3 is a flowchart illustrating a method for training an ECG feature extraction model according to an embodiment of the present disclosure.

FIG. 3 is a flowchart illustrating a method for training the ECG feature extraction model according to an embodiment of the present disclosure.

Referring to FIG. 3, steps 310 to 350 can be performed by a device for training the ECG feature extraction model. The ECG feature extraction model training device according to the present disclosure may be implemented by one or more hardware modules, one or more software modules, or various combinations thereof. Descriptions of FIGS. 1 to 2 can also be applied to FIG. 3, and as such redundant description thereof will herein be omitted for brevity. For example, the ECG feature extraction model training device may be implemented as a server that includes a processor provided with one or more cores, a communication interface, and a memory. The processor included in the server may perform the following steps 310 to 350.

In step 310, the ECG feature extraction model training device may receive at least one of ECG signal or ECG signals. Step 310 may include a process for enabling the ECG feature extraction model training device to load a plurality of the previously obtained ECG signals from the measurement device. In step 310, the input ECG signals may refer to so-called unlabeled raw data in which feature values of data are not pre-classified and only ECG waveforms corresponding to a time interval are input.

In step 320, the ECG feature extraction model training device may input the received ECG signals to the rule-based feature extractor or the neural network model, and may thus extract at least one first feature related to the ECG signals. The ECG feature extraction model training device can classify waveforms of ECG signals, and can extract the at least one first feature from the ECG signal waveforms through either the predetermined rule or the neural network model.

In step 330, the ECG feature extraction model training device may input ECG signals to the encoder, and may thus extract at least one second feature corresponding to the at least one first feature.

In step S340, the ECG feature extraction model training device may perform mapping of the at least one second feature based on at least one of the regression function and the classification function. In other words, the ECG feature extraction model training device may input the at least one second feature to the regression function and/or the classification function to calculate at least one corresponding output value (or the at least one first output value and/or the at least one second output value).

In step 350, the ECG feature extraction model training device may train the ECG feature extraction model based on the mapped result and the at least one first feature. The ECG feature extraction model training device may determine parameters of at least one of the regression function and the classification function and parameters of the encoder. The ECG feature extraction model training device can determine a first loss function based on the at least one first output value (according to a regression function) and the at least one first feature. The ECG feature extraction model training device can determine a second loss function based on the at least one second output value (according to the classification function) and the at least one first feature. The ECG feature extraction model training device can train the ECG feature extraction model such that a loss function determined by combining the first loss function and the second loss function is minimized.

In FIG. 3, steps 310 to 350 may also be implemented as a computer program stored in a computer-readable storage medium. When the computer program is executed in one or more processors, steps 310 to 350 described above can be carried out to perform learning of the ECG feature extraction model.

Figure 4:
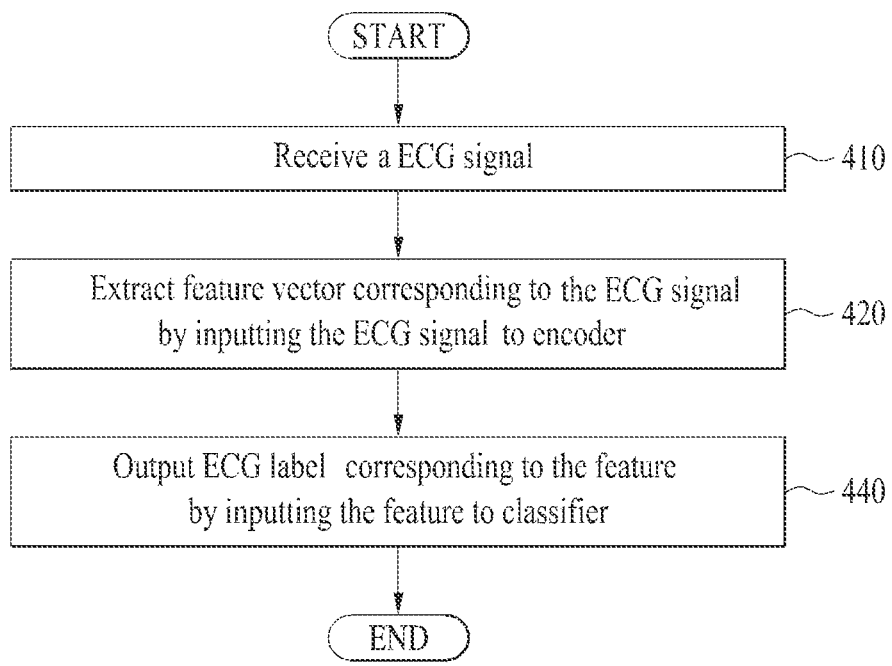
FIG. 4 is a flowchart illustrating a method for outputting ECG labels according to an embodiment of the present disclosure.

FIG. 4 is a flowchart illustrating a method for outputting ECG labels according to an embodiment of the present disclosure.

Referring to FIG. 4, steps 410 to 430 may be performed by an ECG label output device. The ECG label output device according to the embodiment may be implemented by one or more hardware modules, one or more software modules, or various combinations thereof. Descriptions of FIGS. 1 to 2 can also be applied to FIG. 4, and as such redundant description thereof will herein be omitted for brevity. For example, the ECG label output device may be implemented as a server that includes a processor provided with one or more cores, a communication interface, and a memory. The processor included in the server may perform the following steps 410 to 450.

In step 410, the ECG label output device may receive ECG signals.

In step 420, the ECG label output device may input ECG signals to the encoder, and may thus extract features corresponding to the ECG signals. The encoder may be pre-trained by the self-supervised learning not only based on the at least one first feature extracted from the rule-based feature extractor or the neural network model, but also based on the at least one second feature extracted from the encoder.

In step 430, the ECG label output device may input the at least one second feature and/or the at least one first feature to the classifier, and may thus output ECG labels corresponding to each of the input features. In other words, the encoder, transfer learning or self-supervised learning of which was performed, may also output ECG labels to unlabeled input signals.

In FIG. 4, steps 410 to 430 may also be implemented as a computer program stored in a computer-readable storage medium. If the computer program is executed in one or more processors, steps 410 to 430 described above may be performed to perform learning of the ECT feature extraction model.

Figure 5:
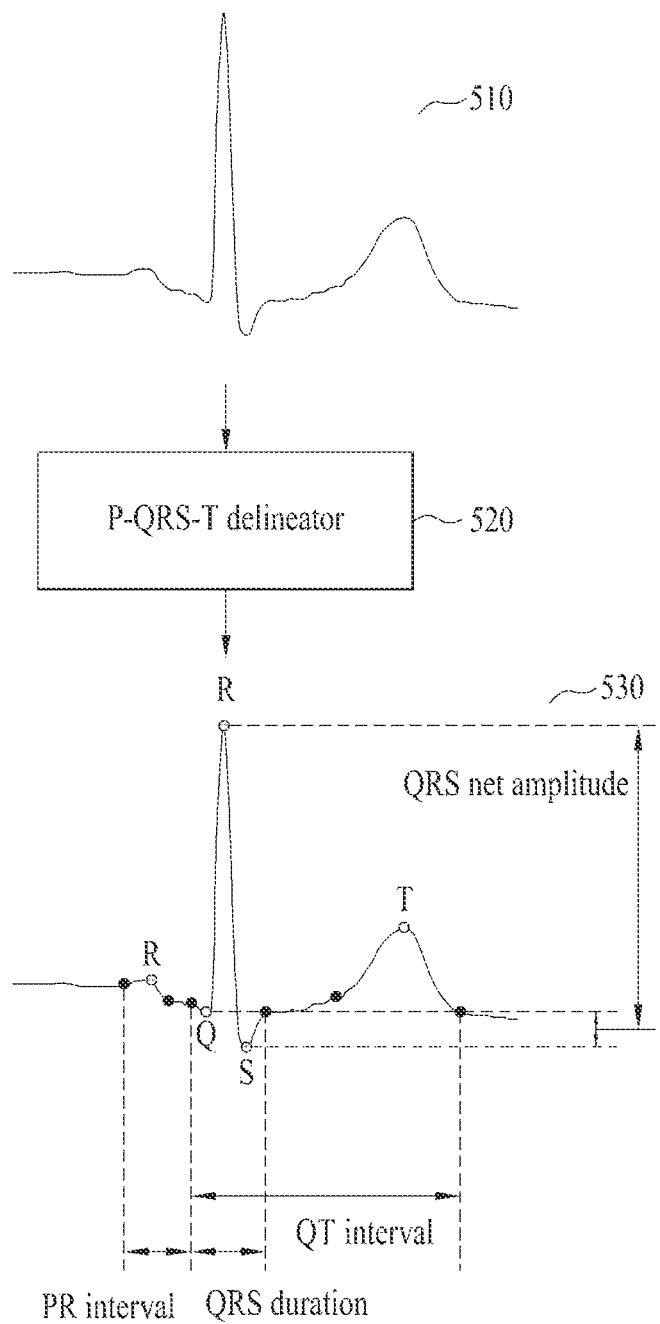
FIG. 5 is a conceptual diagram illustrating a method for operating a rule-based feature extractor according to an embodiment of the present disclosure.

FIG. 5 is a conceptual diagram illustrating a method for operating a rule-based feature extractor according to an embodiment of the present disclosure.

Referring to FIG. 5, the rule-based feature extractor 230 may include a P-QRS-T delineator 520. The P-QRS-T delineator 520 may classify ECG signals 510 into P waves, QRS complex, and T waves, and may thus extract each of information of the P waves, information of the QRS complex, and information of the T waves from the ECG signals 510. For example, the P-QRS-T delineator 520 may extract each of a feature point distinguishing the P waves, a feature point distinguishing the QRS complex, and a feature point distinguishing the T waves from the ECG signals 510 based on a wavelet-based heart rhythm recognition algorithm. In accordance with the embodiment, the P-QRS-T delineator 520 may employ different P-QRS-T distinguishing algorithms capable of distinguishing P waves, QRS complex, and T waves from each other.

The rule-based feature extractor 230 may extract features related to a heart rate, a PR interval, a QRS duration, a QT interval, a QT corrected, an R axis, a P axis, and a T axis based on P waves, QRS complex, and T waves. In the above example, the respective features may be denoted by z1, z2, z3, z4, z5, z6, z7, and z8, respectively. In more detail, the feature related to the heart rate may be denoted by z1, the feature related to the PR interval may be denoted by z2, the feature related to the QRS duration may be denoted by z3, the feature related to the QT interval may be denoted by z4, the feature related to the QT corrected may be denoted by z5, the feature related to the R axis may be denoted by z6, the feature related to the P axis may be denoted by z7, and the feature related to the P axis may be denoted by z8. The heart rate, the PR interval, the QRS duration, and the QT corrected may relate to a signal duration interval. The R axis, the P axis, and the T axis may relate to the amplitude ratio, and may be determined in the range of −180 to 180.

Although not shown in the drawings, the neural network model may allow the rule-based feature extractor 230 to extract the at least one first feature in the same or similar manner as the above-mentioned methods for extracting the at least one first feature. In other words, the at least one first feature may be extracted through the rule-based feature extractor 230, or may be extracted through the neural network model.

Specifically, the neural network model may extract the feature point distinguishing the P waves, the feature point distinguishing the QRS complex, and the feature point distinguishing the T waves from the ECG signals 510, and may extract features related to the heart rate, the PR interval, the QRS duration, the QT interval, the QT corrected, the R axis, the P axis, and the T axis based on different feature points by which the extracted P waves, the extracted QRS complex, and the extracted T waves can be distinguished from each other. The neural network model can effectively extract the feature points and the above-mentioned features through deep learning.

Figure 6A:
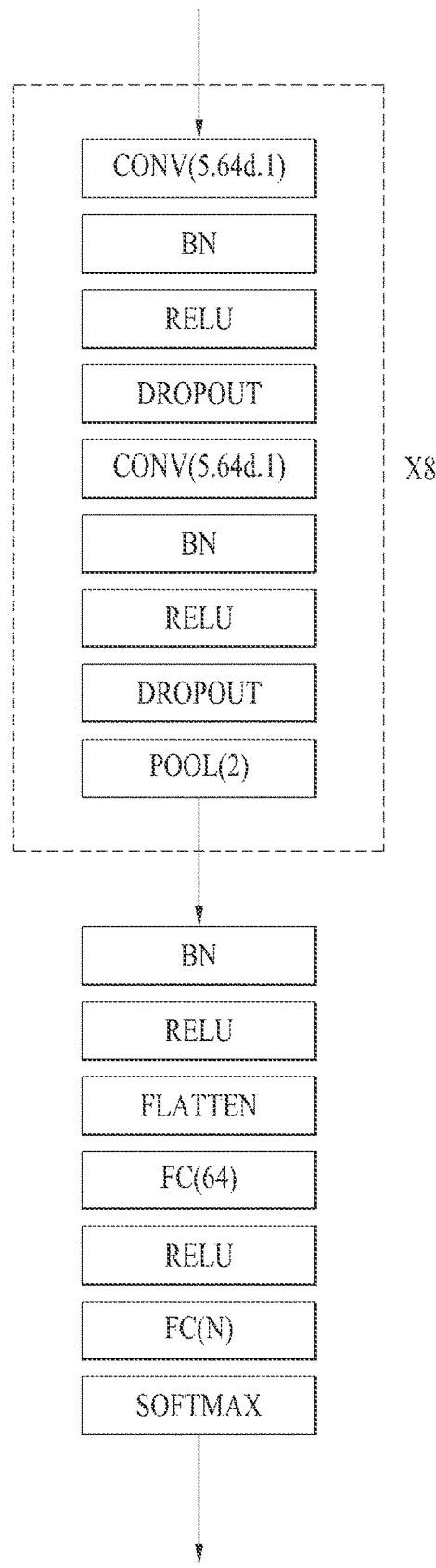
FIGS. 6A and 6B are conceptual diagrams illustrating architectures of an ECG feature extraction model and an ECG label output model according to an embodiment of the present disclosure.
Figure 6B:
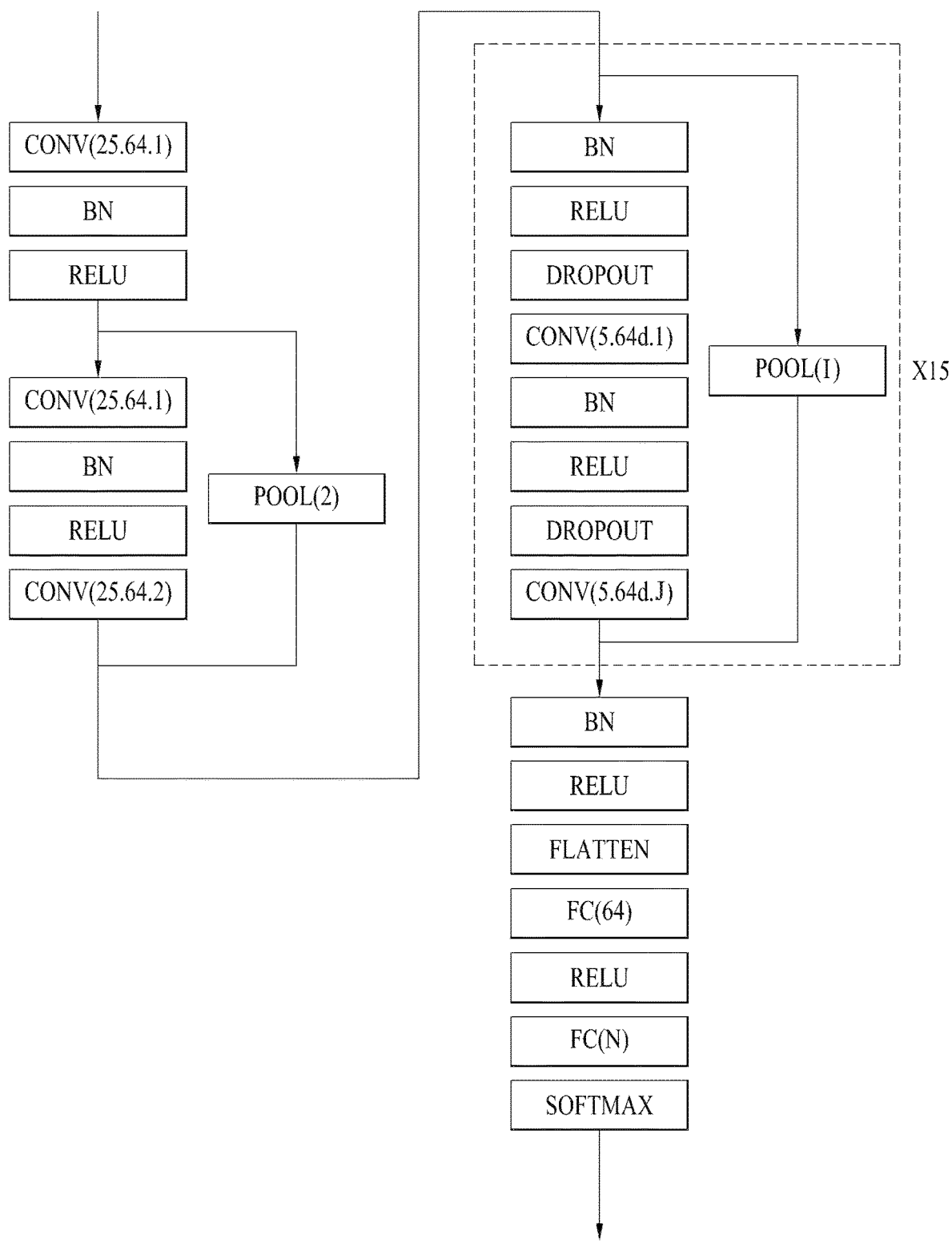

FIG. 6A is a conceptual diagram illustrating the architecture of the ECG feature extraction model according to the present disclosure, and FIG. 6B is a conceptual diagram illustrating the architecture of the ECG label output model according to an embodiment of the present disclosure.

Referring to FIG. 6A, the ECG feature extraction model may include eight blocks. Each of the eight blocks may include two convolution layers and a batch normalization (BN) layer, and may use a ReLU (Rectified Linear Unit) function as an activation function. Moreover, the depth of each convolution layer may be denoted by '64*d', where 'd' may be doubled at intervals of two layers. Down sampling may be performed using a maximum pooling layer after lapse of each block. Two fully connected layers, each of which includes 64 hidden units, may be attached to the end of eight blocks.

Referring to FIG. 6B, the ECG label output model may include 16 blocks. The first block from among the 16 blocks may include a convolution layer. Here, the convolution layer may allow 25 kernels to be attached to each of the start part and the end part of the first block. The first block may further include a batch normalization (BN) layer, a ReLU layer, and a skip connection that is maximally pooled to the size of two kernels. From among the 16 blocks, 15 blocks located subsequent to the first block may include the BN layer, the ReLU layer, the convolution layer, the normalization layer, the other ReLU layer, and the convolution layer, and may then be connected to each other through a maximum pool skip connection. The architecture of the ECG feature extraction model shown in FIG. 6A and the architecture of the ECG label output model shown in FIG. 6B are disclosed only for illustrative purposes, without being limited thereto.

Figure 7:
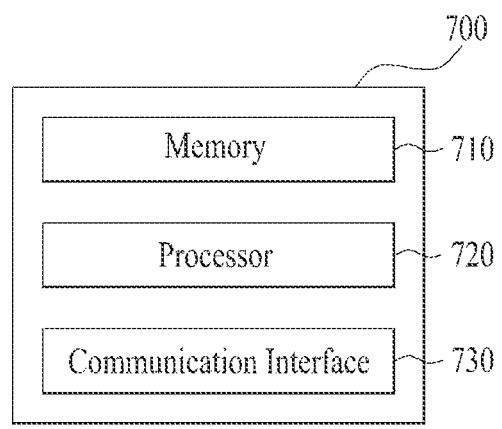
FIG. 7 is a block diagram illustrating a device for training an ECG feature extraction model according to an embodiment of the present disclosure.

FIG. 7 is a block diagram illustrating an ECG feature extraction model training device 700 according to an embodiment of the present disclosure.

Referring to FIG. 7, the ECG feature extraction model training device 700 may include a processor 720. The ECG feature extraction model training device 700 may further include a memory 710 and a communication interface 730. The processor 720, the memory 710, and the communication interface 730 may communicate with each other through a communication bus (not shown).

The processor 720 may receive ECG signals, may extract at least one first feature corresponding to the ECG signals by inputting the ECG signals into the rule-based feature extractor or the neural network model, may extract at least one second features corresponding to the ECG signals by inputting the ECG signals to the encoder, may perform mapping of the at least one second feature based on at least one of the regression function and the classification function, and may train the ECG feature extraction model based on the mapping result and the at least one first feature. In other words, the processor 720 may input the at least one second feature to at least one of a regression function and a classification function to calculate at least one output value. In this case, the processor 720 may learn the ECG feature extraction model based on the calculated at least one output value and the at least one first feature.

Or, the processor is configured to classify waveforms of the ECG signal, and extract the at least one first feature from the ECG signal waveforms according to a predetermined rule. The processor is configured to classify the ECG signal into P waves, QRS complex, and T waves, and extract the at least one first feature corresponding to at least one of a heart rate, a PR interval, a QRS duration, a QT interval, a QT corrected, an R axis, a P axis, and a T axis, based on the P waves, the QRS complex, and the T waves. The processor is configured to determine a first loss function based on the at least one first output value and the at least one first feature, determine a second loss function based on the at least one second output value and the at least one first feature, and pre-train the ECG feature extraction model to minimize a loss function that is determined by a combination of the first loss function and the second loss function. The pre-trained encoder is transfer-learned based on a labeled ECG signal and a feature value of the labeled ECG signal. In the pre-training of the ECG feature extraction model, the processor is configured to determine a parameter of at least one of the regression function and the classification function and a parameter of the encoder. At least one output value includes at least one first output value calculated by inputting the at least one second feature to the regression function, and at least one second output value calculated by inputting the at least one second feature to the classification function.

The memory 710 may be a volatile memory or a non-volatile memory.

In addition, the processor 720 may execute a program, and may control the ECG feature model training device 700 using the program. Program code executed by the processor 720 may be stored in the memory 710. The ECG feature model training device 700 may be connected to an external device (e.g., a personal computer or a network) through an input/output (I/O) device, and may exchange data with the external device. The ECG feature model training device 700 may be embedded (or built) in the server.

Figure 8:
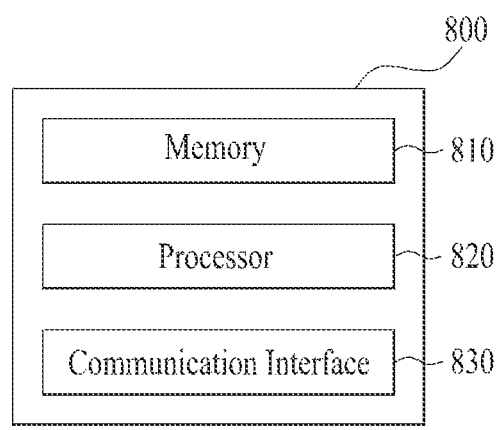
FIG. 8 is a block diagram illustrating a device for outputting ECG labels according to an embodiment of the present disclosure.

FIG. 8 is a block diagram illustrating a device 800 for outputting ECG labels according to an embodiment of the present disclosure.

Referring to FIG. 8, the ECG label output device 800 may include a processor 820. The ECG label output device 800 may further include a memory 810 and a communication interface 830. The processor 820, the memory 810, and the communication interface 830 may communicate with each other through a communication bus (not shown). The encoder may be pre-trained by self-supervised learning not only based on the at least one first feature extracted from either the rule-based feature extractor or the neural network model, but also based on the at least one second feature extracted from the encoder.

The memory 810 may be a volatile memory or a non-volatile memory.

In addition, the processor 820 may execute a program, and may control the ECG label output device 800 using the program. Program code executed by the processor 820 may be stored in the memory 810. The ECG label output device 800 may be connected to an external device (e.g., a personal computer or a network) through an input/output (I/O) device, and may exchange data with the external device. The ECG label output device 800 may be embedded (or built) in the server.

The embodiments described above may be implemented in hardware components, software components, and/or combinations of hardware components and software components. For example, the devices, methods and constituent components described in the above embodiments may be implemented using at least one general purpose computer or at least one special purpose computer in the same manner as in any other devices, for example, a processor, a controller, an arithmetic logic unit (ALU), a digital signal processor, a microcomputer, a field programmable gate array (FPGA), a programmable logic unit (PLU), a microprocessor, or other devices that can execute and answer instructions. The processing device may perform an operating system (OS) and one or more software applications executed in the operating system (OS). In addition, the processing device may access, store, manipulate, process, and generate data in response to execution of the software. Although only one processing device is used in the embodiments for convenience of description, the scope or spirit of the present disclosure is not limited thereto, and it can be appreciated by those skilled in the art that the processing device may include a plurality of processing elements and/or several types of processing elements. For example, the processing device may include a plurality of processors or one processor and one controller. Other processing configurations are also possible, such as a parallel processor.

The software may include a computer program, code, instructions, or a combination thereof, to independently or collectively instruct and/or configure the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in computer-readable media including program instructions to implement various operations of the above-described embodiments. The computer-readable media may also include, alone or in combination with the program instructions, data files, data structures, and the like. According to at least some example embodiments, the program instructions recorded on the media may be those specially designed and constructed for the purposes of example embodiments. Examples of the computer readable recording media may include magnetic disk storage media, such as a hard disk drive (HDD), a floppy disk, and a magnetic tape, optical media, such as a compact disc read only memory (CD-ROM) and a digital versatile disk (DVD), magneto-optical media, such as a floptical disk, and hardware devices, such as a read only memory (ROM), a random access memory (RAM), and a flash memory, which are particularly configured to store and execute program commands. Examples of the program commands may include, for example, high-level language code executable by a computer using an interpreter as well as machine language code generated by a complier.

As described above, although the embodiments have been described in connection with the limited embodiments and drawings, those skilled in the art may modify and change the embodiments in various ways from the description. For example, proper results may be achieved although the above descriptions are performed in order different from that of the described method, and/or the aforementioned elements, such as a system, a configuration, a device, and a circuit, are coupled or combined in a form different from that of the described method or replaced or substituted with other elements or equivalents.

Accordingly, other implementations, other embodiments, and equivalents of the claims fall within the scope of the claims.

As is apparent from the above description, the embodiments of the present disclosure can apply features of ECG signals to the supervised learning using the self-supervised learning.

The embodiments of the present disclosure can apply the new self-supervised learning method to the actual clinical environment that has difficulty in acquiring a large amount of ECG labels.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A method for learning an electrocardiogram (ECG) label output model by a computing device comprising:
   receiving at least one unlabeled ECG signal and at least one labeled ECG signal;
   performing self-supervised learning of an ECG feature extraction model including an encoder and a rule-based feature extractor based on the at least one unlabeled ECG signal; and
   performing supervised learning of the ECG label output model based on the at least one labeled ECG signal,
   wherein the ECG label output model is configured to include the encoder pre-trained through the self-supervised learning of the ECG feature extraction model and a classifier configured to classify a diagnostic label;

wherein the self-supervised learning of the ECG feature extraction model includes:
extracting at least one first feature from the at least one unlabeled ECG signal using the rule-based feature extractor;
extracting at least one second feature from the at least one unlabeled ECG signal using the encoder;
obtaining at least one output value by mapping the at least one second feature to at least one of a regression function and a classification function; and
performing the self-supervised learning of the ECG feature extraction model using a loss function based on the at least one output value and the at least one first feature.

2. The method according to claim 1, wherein the extracting the at least one first feature includes:
classifying waveforms of an ECG signal included in the at least one unlabeled ECG signal; and
extracting the at least one first feature from the waveforms of the ECG signal according to a predetermined rule.

3. The method according to claim 2, wherein the classifying the waveforms of the ECG signal includes classifying the ECG signal into P waves, QRS complex, and T waves, and
wherein the extracting the at least one first feature includes extracting the at least one first feature corresponding to at least one of a heart rate, a PR interval, a QRS duration, a QT interval, a QT corrected, an R axis, a P axis, and a T axis, based on the P waves, the QRS complex, and the T waves.

4. The method according to claim 1, wherein the supervised learning of the ECG label output model includes:
adjusting parameters related to the encoder to minimize a difference between at least one feature extracted from the labeled ECG data and the at least one output value.

5. The method according to claim 1, wherein the self-supervised learning of the ECG feature extraction model further includes:
determining a parameter of at least one of the regression function and the classification function and a parameter of the encoder.

6. The method according to claim 1, wherein at least one output value includes:
at least one first output value calculated by inputting the at least one second feature to the regression function, and
at least one second output value calculated by inputting the at least one second feature to the classification function.

7. The method according to claim 6, wherein the self-supervised learning of the ECG feature extraction model further includes:
determining a first loss function based on the at least one first output value and the at least one first feature;
determining a second loss function based on the at least one second output value and the at least one first feature; and
pre-training the encoder to minimize the loss function that is determined by a combination of the first loss function and the second loss function.

8. A computing device comprising:
a processor provided with one or more cores;
a communication interface; and
a memory,
wherein the processor is configured to:
receive at least one unlabeled ECG signal and at least one labeled ECG signal;
perform self-supervised learning of an ECG feature extraction model including an encoder and a rule-based feature extractor based on the at least one unlabeled ECG signal; and
perform supervised learning of the ECG label output model based on the at least one labeled ECG signal,
wherein the ECG label output model is configured to include the encoder pre-trained through the self-supervised learning of the ECG feature extraction model and a classifier configured to classify a diagnostic label,
wherein the self-supervised learning of the ECG feature extraction model includes extracting at least one first feature from the at least one unlabeled ECG signal using the rule-based feature extractor, extracting at least one second feature form the at least one unlabeled ECG signal using the encoder of the ECG label output model, obtaining at least one output value by mapping the at least one second feature to at least one of a regression function and a classification function for an ECG feature extraction model, and performing the self-supervised learning of the ECG feature extraction model using a loss function based on the at least one output value and the at least one first feature.

9. The computing device of claim 8, wherein the processor is further configured to classify waveforms of an ECG signal included in the at least one unlabeled ECG data, and extract the at least one first feature from the waveforms of the ECG signal according to a predetermined rule.

10. The computing device of claim 9, wherein the processor is further configured to:
classify the ECG signal into P waves, QRS complex, and T waves, and
extract the at least one first feature corresponding to at least one of a heart rate, a PR interval, a QRS duration, a QT interval, a QT corrected, an R axis, a P axis, and a T axis, based on the P waves, the QRS complex, and the T waves.

11. The computing device of claim 8, wherein, in the self-supervised learning of the ECG feature extraction model, the processor is further configured to determine a parameter of at least one of the regression function and the classification function and a parameter of the encoder.

12. The computing device of claim 8, wherein the self-supervised learning of the ECG feature extraction model includes:
at least one first output value calculated by inputting the at least one second feature to the regression function, and
at least one second output value calculated by inputting the at least one second feature to the classification function.

13. The computing device of claim 12, wherein, in the self-supervised learning of the ECG feature extraction model, the processor is further configured to:
determine a first loss function based on the at least one first output value and the at least one first feature;
determine a second loss function based on the at least one second output value and the at least one first feature; and
pre-train the encoder to minimize the loss function that is determined by a combination of the first loss function and the second loss function.

* * * * *